UNITED STATES PATENT OFFICE.

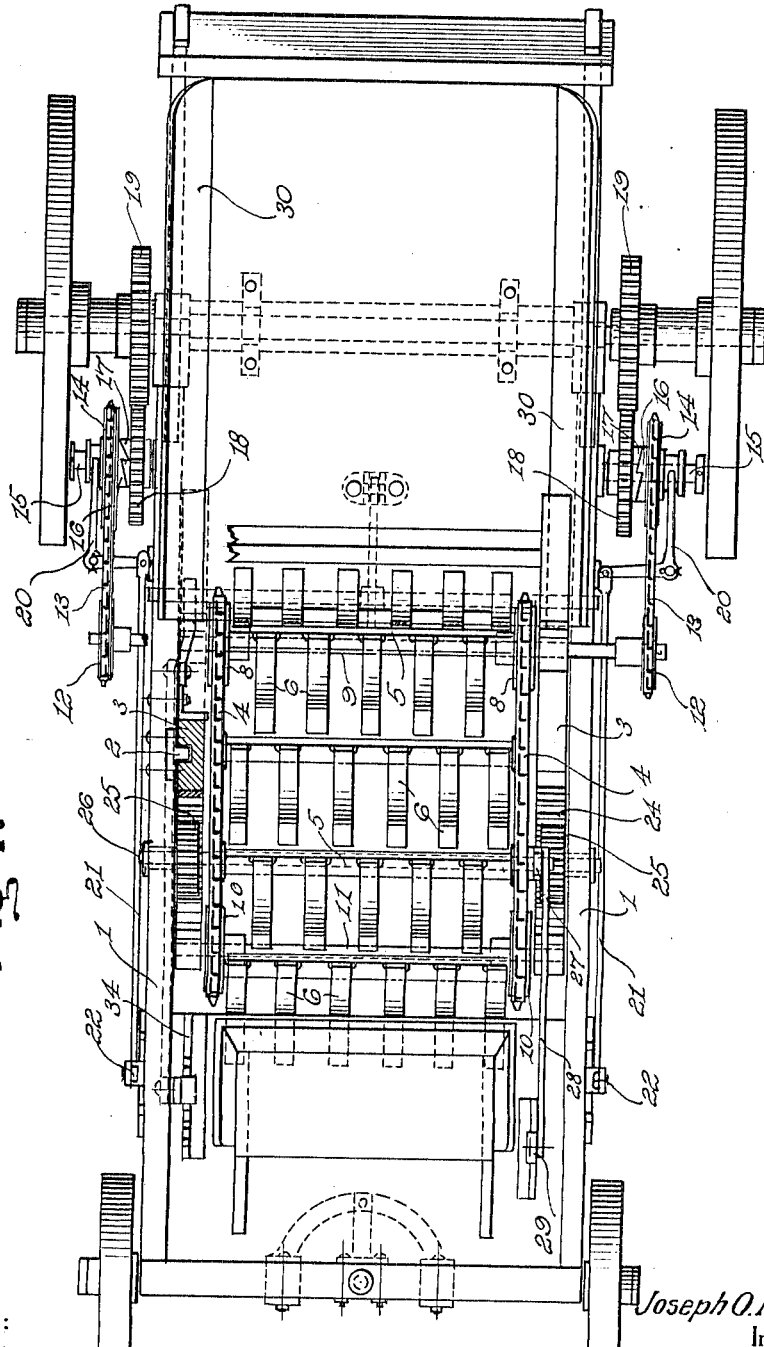

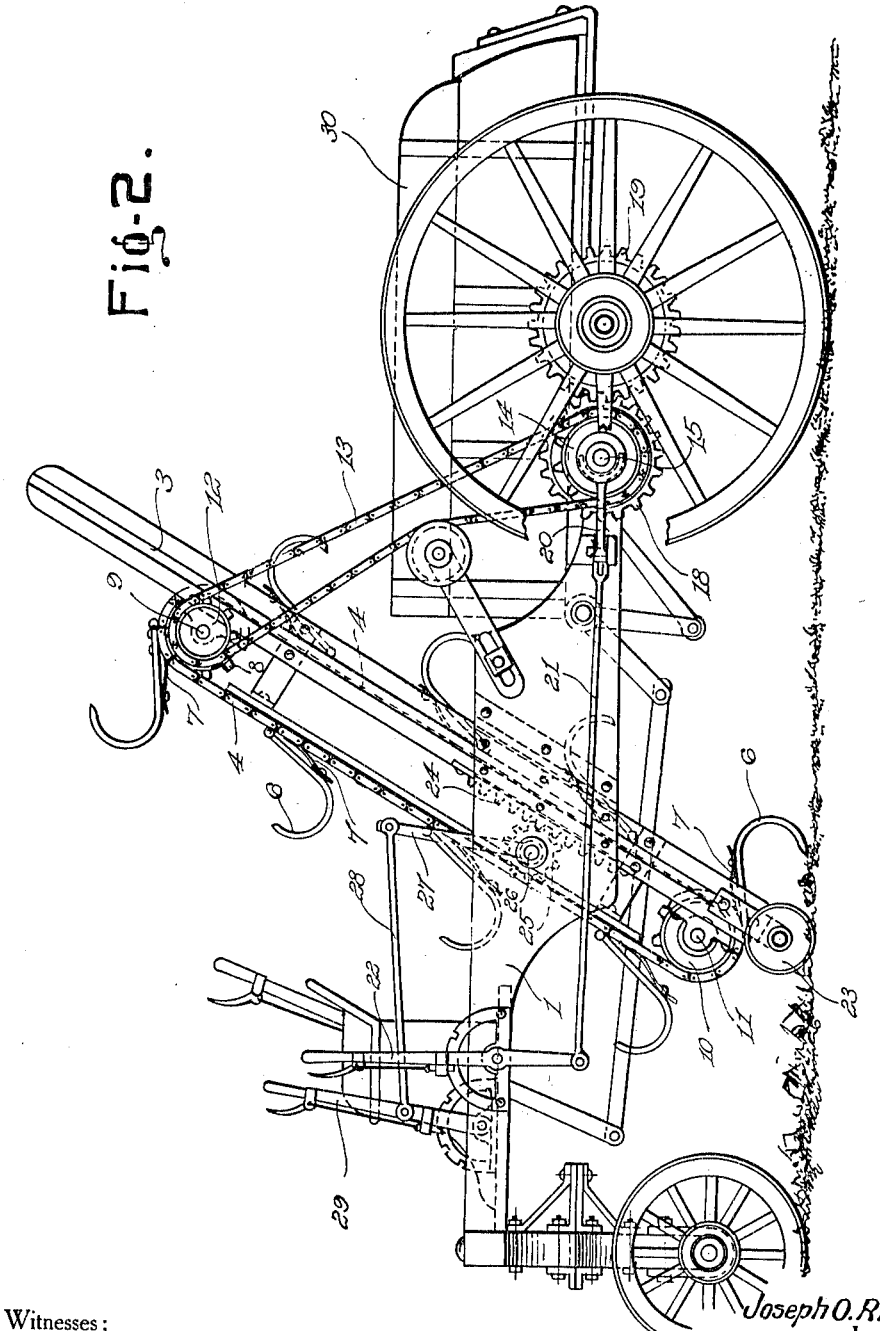

JOSEPH OCTAVE RICHARD, OF STE. JULIE STATION, QUEBEC, CANADA.

STONE-GATHERING MACHINE.

1,090,231.

Specification of Letters Patent. Patented Mar. 17, 1914.

Application filed June 30, 1913. Serial No. 776,460.

*To all whom it may concern:*

Be it known that I, JOSEPH OCTAVE RICHARD, a subject of the King of Great Britain, residing at Ste. Julie Station, in the Province of Quebec, Canada, have invented certain new and useful Improvements in Stone-Gathering Machines; and I do hereby declare that the following is a full, clear, and exact description of the invention, such as will enable others skilled in the art to which it appertains to make and use the same.

The invention to be hereinafter described relates to stone gathering machines.

In order to more clearly disclose the construction, operation and use of the invention, reference should be had to the accompanying drawings forming part of the present application.

Throughout the several figures of the drawings like reference characters designate the same parts.

In the drawings: Figure 1 is a top plan view of the invention; and Fig. 2 is a side elevation.

Referring to the drawings in detail, 1 indicates a supporting frame work of any suitable construction and provided with the usual front and rear axles for the supporting wheels, the rear axle being stationary and the wheels revoluble thereon. At about the longitudinal center of each side member of the frame is secured an inclined T plate or other guide 2 fitting into a longitudinal groove in the side member of a conveyer frame, to be hereinafter described. On these guides is slidably mounted a conveyer frame 3 in which is carried a conveyer comprising a pair of sprocket chains 4 connected by cross bars 5 to each of which are pivoted a plurality of grab hooks 6 each outwardly pressed by a leaf spring 7. The sprocket chains 4 are driven by the sprocket wheels 8 on the shaft 9, and pass over lower idler sprockets 10 on a shaft 11. The shaft 9 is driven by two sprocket wheels 12 secured thereto, and coöperating sprocket chains 13, one at each side of the machine. Each of these chains is driven from a sprocket wheel 14 free to have both sliding and rotary movement on a stub shaft 15 fixed in the frame. The hub of each of these sprocket wheels is provided with a clutch member 16 adapted to be intermeshed with a coöperating clutch face 17 on the hub of a pinion 18 freely revoluble on the same stub shaft. This pinion intermeshes with and is continuously driven by a gear 19 fixed to the hub of each rear supporting wheel. Bell crank levers 20, fulcrumed in suitable brackets or plates projecting from the frame, move the clutch members 16 into and out of engagement. These levers are connected by links 21 to hand levers 22 placed near the operator's seat and coöperating, in the usual manner, with the notched arc plates. The main weight of the conveyer and its frame is sustained by supporting rollers 23 secured to the lower end of the side members of the conveyer frame and adapted to travel on the surface over which the machine is drawn.

In order to adjust the conveyer toward and from the surface over which the machine travels, each of the side members of the conveyer frame is provided with a rack section 24 adapted to be engaged and operated by one of two pinions 25 fixed to opposite ends of a shaft 26 journaled in the frame 1. The shaft 26 is provided with a crank arm 27 which is connected by a link 28 to a hand lever 29 which coöperates in the usual manner with a notched arc plate.

The stones, of course, are gathered by the grab hooks 6, elevated by the conveyer, and then discharged rearwardly and downwardly from the upper end. A dump wagon body 30 receives them. This body may be made fast to the rear axle or may be free thereon. In either case, the axle acts as the axis about which the body may be dumped.

It is thought that the operation and use of the invention will be clear from the preceding detailed description.

Changes may be made in the construction, arrangement, and disposition of the several parts of the invention without in any way departing from the field and scope of the same, and it is meant to include all such within this application wherein only a preferred form has been disclosed.

Having thus fully described my invention, what I claim as new and desire to secure by Letters Patent is:

1. A conveyer comprising, a vertically adjustable frame, sprocket wheels at each end thereof, chains operative thereover, bars connecting the chains, grab hooks carried thereby and pivotally connected thereto, leaf springs connected to the hooks and to the bars for the purpose of actuating the hooks, and means for operating the lower end of the frame so that it travels at a uniform distance from the surface of the ground.

2. A conveyer comprising; a vertically adjustable frame; sprocket wheels at each end thereof; chains operative thereover; bars connecting the chains; grab hooks carried thereby and pivotally connected thereto; leaf springs having their outer ends secured to the said grab hooks and their inner ends secured to the said bars, the springs being adapted to prevent outward movement of the hooks relative to the bars and to allow the hooks to have a slight inward give when gathering stones, for the purpose of preventing shock; and means for supporting the lower end of the frame so that it travels at a uniform distance from the surface of the ground.

3. In combination with a transporting frame and an inclined conveyer frame, rollers on the lower end of the latter frame running on the ground, conveyer chains and cross-bars mounted on said conveyer frame, grab-hooks individually pivoted on said cross-bars and springs attached to said hooks and holding them against outward movement, though permitting them to yield slightly to the resistance of the stones.

In witness whereof I have hereunto set my hand in the presence of two witnesses.

JOSEPH OCTAVE RICHARD.

Witnesses:
OCTAVE GINGRAS,
JOSEPH ALFRED RICHARD.

---

Copies of this patent may be obtained for five cents each, by addressing the "Commissioner of Patents, Washington, D. C."